United States Patent [19]

Kaminski

[11] Patent Number: 4,814,655

[45] Date of Patent: Mar. 21, 1989

[54] VENTILATED GUSSET FOR SINGLE-LAYER TURNS IN A DYNAMOELECTRIC MACHINE

[75] Inventor: Christopher A. Kaminski, Schenectady, N.Y.

[73] Assignee: General Electric Company, Schenectady, N.Y.

[21] Appl. No.: 135,811

[22] Filed: Dec. 21, 1987

[51] Int. Cl.$^4$ .............................................. H02K 3/46
[52] U.S. Cl. ...................... 310/260; 310/57; 310/59; 310/60 R; 310/270
[58] Field of Search ............... 310/260, 270, 52, 54, 310/55, 57, 58, 59, 60 R, 60 A, 61, 64, 65, 201; 336/60, 197

[56] References Cited

U.S. PATENT DOCUMENTS

| | | | |
|---|---|---|---|
| 3,005,119 | 10/1961 | Schmitt | 310/61 |
| 3,112,415 | 11/1963 | Bahn | 310/57 |
| 3,395,299 | 7/1968 | Quay | 310/61 |
| 4,199,700 | 4/1980 | Daugherty | 310/260 |
| 4,321,497 | 3/1982 | Long | 310/201 |
| 4,543,503 | 9/1985 | Kaminski | 310/270 |
| 4,598,223 | 7/1986 | Glennon | 310/260 |

FOREIGN PATENT DOCUMENTS

0976931 12/1964 United Kingdom .................. 310/61

Primary Examiner—R. Skudy
Attorney, Agent, or Firm—Jerome C. Squillaro

[57] ABSTRACT

A conductor bar in a dynamoelectric machine includes a coolant channel having a depressed portion passing under a gusset reinforcing a joint with an end turn. The end turn also includes a coolant channel with a depressed portion under the gusset and meeting the depressed portion in the conductor bar. The gusset includes a groove therein, generally congruent with the two depressed portions passing thereunder. Diagonal entry and exit portions on the underside of the gusset reduce flow turbulence of coolant entering and exiting the flow channel defined between the gusset and the two depressed portions. In a further embodiment of the invention, a diagonal portion joining the two depressed portions, matched with a congruent shape in the gusset, both reduces flow resistance and increases an area available for brazing the gusset in place.

9 Claims, 5 Drawing Sheets

Fig. 1

VENTILATED GUSSET FOR SINGLE-LAYER TURNS IN A DYNAMOELECTRIC MACHINE

BACKGROUND OF THE INVENTION

The present invention relates to dynamoelectric machines and, more particularly, to techniques for cooling end turns of large dynamoelectric machines.

Resistive heating in the field winding of a rotor of a large dynamoelectric machine such as, for example, a large generator or motor, limits the amount of current which can be passed through the field winding to produce a magnetic field. The average current, and the consequent magnetic field strength, must remain below a value resulting in temperatures high enough to degrade the structure of the dynamoelectric machine.

A rotor of a large dynamoelectric machine typically consists of a forging of a magnetic metal having a plurality of longitudinal slots formed therein. Conductor bars are disposed in the slots for carrying energizing current. The ends of the conductor bars are suitably interconnected using conductive end turns to construct a current pattern required to attain the desired distribution of magnetic flux in the rotor.

Both the conductor bars and the end turns, being composed of metal having a finite, non-zero, resistance, give rise to resistive heating.

One passive technique for avoiding excessive temperature in the conductor bars and the end turns includes increasing the rotor size sufficiently to dissipate the expected resistive power dissipation. This solution requires a larger machine with consequent increases in costs of material, installation and foundation.

It is common to employ cooling gas forced through channels in the conductor bars. In some such systems, the conductor bars are formed as a plurality of stacked layers of copper bars. The cooling gas is forced diagonally downward through gas channels aligned in all of the layers, is turned around at the bottom of the stack, and is returned to the surface for recycling. In other systems, cooling gas is forced through at least one longitudinal channel in the conductor bars in thermal contact with the metal.

Some machines using single-layer conductors in the conductor bars and end turns, employ a mitered joint to form the right-angle turn required to permit the end turns to interconnect the required conductor bars. Strength is important in these locations since they are subject to strong thermal cycling. Gussets are brazed in place at the mitered joints to add the requisite strength to the mitered joint.

It is convenient to employ a longitudinal gas channel formed in the surface of the conductor bar to provide a gas channel. The surface is closed by a plate to retain the gas for flow along the entire length of the channel. It is not possible to continue the gas channel through the gusset to the end turn since effectively this would sever the gusset into two pieces and reduce the reinforcement available in the critical area of the mitered joint. Accordingly, it is conventional practice to provide a relatively elaborate and expensive baffling scheme to feed cooling gas to the end turns.

OBJECTS AND SUMMARY OF THE INVENTION

It is an object of the invention to provide a technique for cooling end turns of a rotor of a dynamoelectric machine which overcomes the drawbacks of the prior art.

It is a further object of the invention to provide a technique for connecting cooling gas from a surface channel in a conducting bar through a gusset to a surface channel in an end turn without destroying the reinforcement provided by the gusset.

It is a still further object of the invention to provide a coolant channel passing through a gusset joining a mitered joint between a conducting bar and an end turn of a dynamoelectric machine.

Briefly stated, the present invention provides apparatus in a rotor of a dynamoelectric machine including a conductor bar having a coolant channel formed as a depressed portion passing under a gusset reinforcing a joint with an end turn. The end turn also includes a coolant channel with a depressed portion under the gusset and meeting the depressed portion in the conductor bar. The gusset includes a groove therein, generally congruent with the two depressed portions passing thereunder. Diagonal entry and exit portions on the underside of the gusset reduce flow turbulence of coolant entering and exiting the flow channel defined between the gusset and the two depressed portions. In a further embodiment of the invention, a diagonal portion joining the two depressed portions, matched with a congruent shape in the gusset, both reduce flow resistance and increases an area available for brazing the gusset in place.

According to an embodiment of the invention, there is provided apparatus for cooling a portion of a dynamoelectric machine, the dynamoelectric machine being of a type having at least one conductor bar and at least one end turn contiguous to the at least one conductor bar, comprising: a joint 66 a junction of the at least on conductor bar and the at least one end turn, a first channel or groove 74 in a first surface of the conductor bar, first layer means 38 for retaining a coolant in the first groove, a second channel or groove 78 in a second surface of the end turn, second layer or means 58 for retaining the coolant in the second groove, the first and second grooves communicating the coolant at the joint, a gusset, the gusset 68 overlapping a first portion of the conductor bar adjacent to the joint, the gusset further overlapping a second portion of the end turn adjacent to the joint, whereby the joint is strengthened, the gusset including a surface facing the first and second grooves, the surface including a third groove 86, and the third groove being substantially congruent to facing portions of the first and second grooves, whereby a flow passage for the coolant is formed passing through the joint, whereby a single flow of coolant is effective for cooling both the end turn and the conductor bar.

According to a feature of the invention, there is provided apparatus for cooling a portion of a dynamoelectric machine, the dynamoelectric machine being of a type having at least one conductor bar 62 and at least one end turn 64 contiguous to the at least one conductor bar, comprising: a joint 66 at a junction of the at least one conductor bar and the at least one end turn, a first channel or groove 74 in a first surface of the conductor bar, first layer or means 38 for retaining a coolant in the first groove, a second channel or groove 78 in a second surface of the end turn, second means for retaining the coolant in the second groove, the first and second grooves communicating the coolant at the joint, a first rabbet 70 in the conductor bar adjacent the joint, a second rabbet 72 in the end turn adjacent the joint, a gusset 68 fitted into the first and second rabbets, with its outer surface substantially coplanar with outer surfaces of the conductor bar and the end turn, the gusset overlapping a first portion of the conductor bar adjacent to the joint, the gusset further overlapping a second portion of the end turn adjacent to the joint, whereby the joint is strengthened, the gusset including a surface facing the first and second grooves, the surface including a third groove 86, and the first groove includes a first depressed portion 76, the first depressed portion extending from the joint along the at least one conductor bar beyond the gusset, the second groove includes a second depressed portion 80, the second depressed portion extending from the joint along the at least one end turn beyond the gusset, the third groove being substantially congruent to facing portions of the first and second depressed portions, depths of the first and second depressed portions being such that a depth of the flow passage beneath the gusset is no less than a depth of the first and second grooves outside the first and second depressed portions.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention may be used in the rotors of any suitable dynamoelectric machines including, for example, generators and motors. For concreteness, however, the present invention is described in the environment of a motor. It will be understood that the description is equally applicable to other types of dynamoelectric machines.

Figure 1:
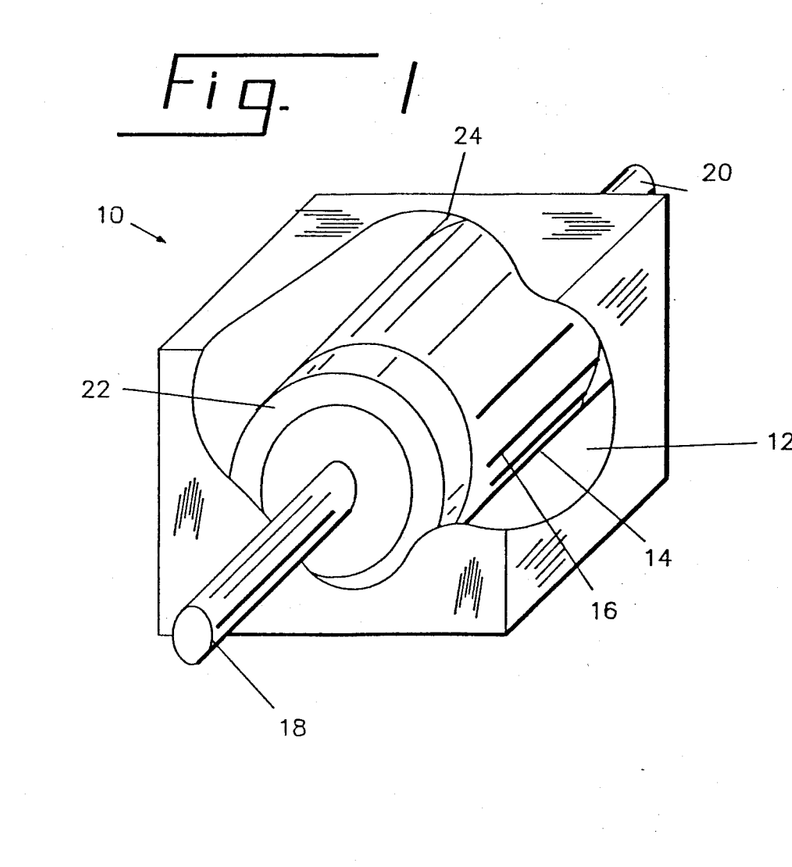
FIG. 1 is a perspective view, partly cut away, of a dynamoelectric machine in which the present invention may be used.

Referring first to FIG. 1, there is shown, generally at 10, a dynamoelectric machine such as, for example, a motor. A stator 12, built up by stacking laminations (not individually shown) surrounds the cylindrical periphery of a rotor 14. Rotor 14 includes a generally cylindrical rotor forging 16 having first and second shafts 18 and 20 extending axially from opposed ends thereof. In some embodiments, shafts 18 and 20 are integrally formed with rotor forging 16. Although not shown, shaft 20 may be connected to drive a DC generator for providing DC power to magnetizing conductors in rotor 14, and shaft 18 may be connected to a load.

Retaining rings 22 and 24 are disposed on ends of rotor forging 16 to support end turns (not shown) against centrifugal acceleration due to rapid rotation of rotor 14. It is conventional in some machines to shrink fit retaining rings 22 in place for secure retention. Shrink fitting is conventional, thus further description thereof is unnecessary.

Figure 2:
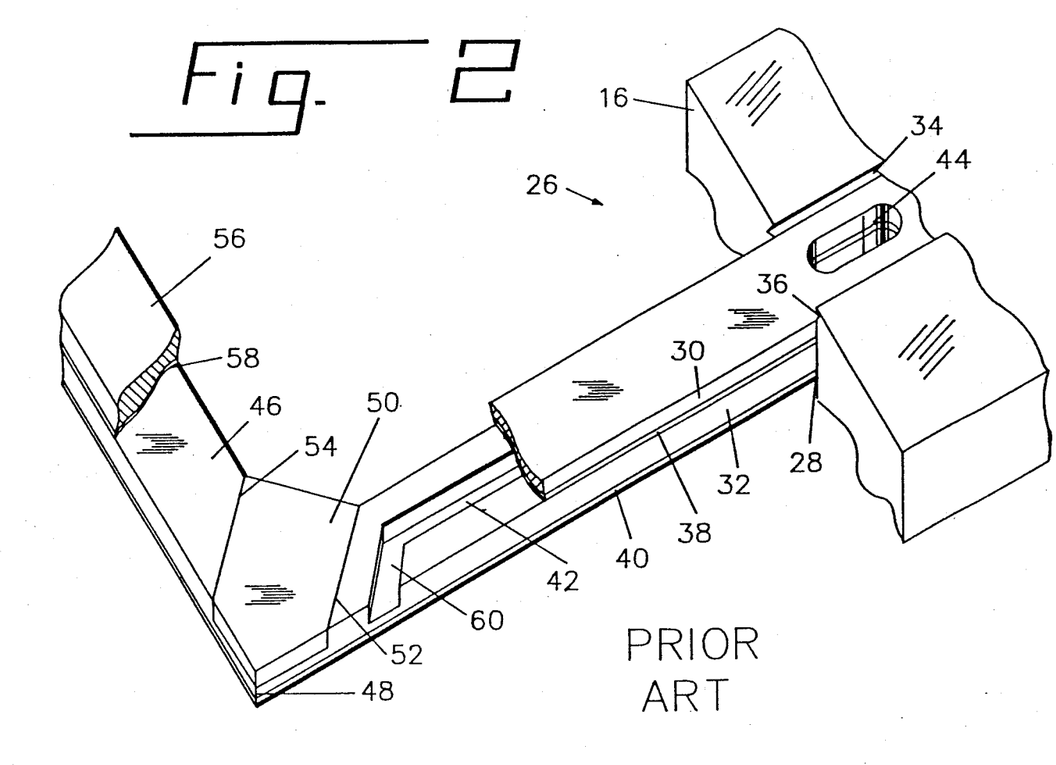
FIG. 2 is a close-up view of a portion of the rotor of the dynamoelectric machine of FIG. 1 showing the manner in which a miter joint between a conducting bar and an end turn is reinforced by a gusset according to the prior art.

Referring now to FIG. 2, an end portion 26 of rotor forging 16 according to prior art is shown. A plurality of slots 28 (only one of which is shown) contain a plurality of conductor bars 30 and 32 conventionally held in place by dovetail wedges (removed to reveal lower components in the figure) in dovetail slots 34 and 36. Conductor bars 30 and 32 conventionally are copper bars. An insulating layer 38 between conductor bars 30 and 32 provides electrical isolation therebetween. A further insulating layer 40 on a bottom surface of conductor bar 32 provides electrical insulation from an underlying conductor bar (not shown).

A coolant channel 42 is milled, or otherwise formed, in the surface of conductor bar 32. Insulating layer 38, lying atop conductor bar 32, closes coolant channel 42 to form a closed channel for permitting a flow of cooling gas to contact conductor bar 32, thereby removing heat therefrom. An opening 44, suitably aligned in all conductor bars, permits passage of the cooling gas through coolant channel 42 and all corresponding elements in other conductor bars (not shown).

An end turn 46 is connected to conductor bar 32 at a mitered joint 48. As is well known, end turns are employed to interconnect the ends of conductor bars in a pattern required to produce a desired pattern of magnetic fields in rotor forging 16. The interconnection of end turns are so well known that they do not require further description herein.

The abutting surfaces of conductor bar 32 and end turn 46 forming mitered joint 48 produce and inherently weak joint. Reinforcement is provided at this location by a gusset 50 overlapping the ends of conductor bar 32 and end turn 46. Preferably the ends of conductor bar 32 and end turn 46 are partially cut away to form rabbets 52 and 54, respectively for permitting gusset 50 to lie flush therein. For strength, gusset 50 is preferably brazed to abutting surfaces of conductor bar 32 and end turn 46. A further end turn 56, with an insulating layer 58, overlies end turn 46. End turn 56 and conductor bar 30 may be joined in the same manner as described for conductor bar 32 and end turn 46. Additional conductor bars 30 may be disposed in slot 28 but are ignored herein for simplicity of presentation.

It would be desirable to permit cooling of end turn 46 by continuing coolant channel 42 past mitered joint 48. To do so, however, would require severing gusset 50 into two pieces, thereby essentially destroying the reinforcement provided thereby. This is especially undesirable because of the high stresses resulting from thermal cycling in this location. Accordingly, it is conventional to terminate coolant channel 42 short of gusset 50 using, for example, an entrance channel 60 leading to the edge of conductor bar 32 through which the cooling gas may be drawn. If cooling of end turn 46 is required, it is conventional to provide a flow of cooling gas using relatively complex and expensive baffling devices (not shown) to feed coolant gas to coolant channels (not shown) therein.

Figure 3:
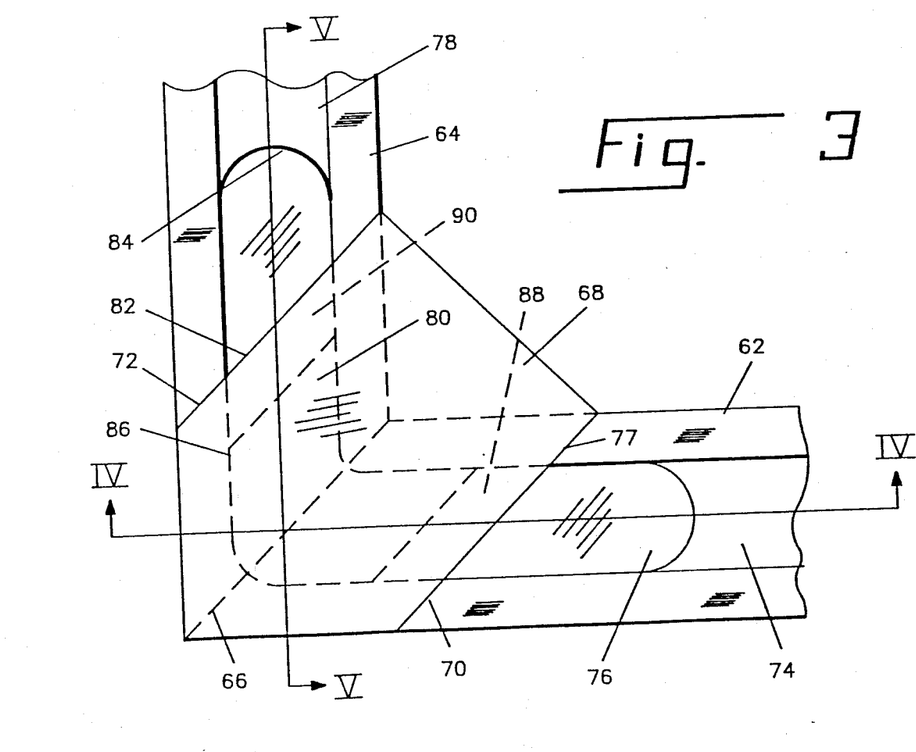
FIG. 3 is a top view of a miter joint and gusset between a conductor bar and an end turn according to an embodiment of the invention.

Referring now to FIG. 3, a conductor bar 62 and an end turn 64 abut at a mitered joint 66. A gusset 68 is set flush into rabbets 70 and 72 at the ends of conductor bar 62 and end turn 64, respectively. A coolant channel 74 joins a depressed portion 76 as it approaches an upstream edge 77 of gusset 68. As indicated in dashed line, depressed portion 76 continues under gusset 68 to mitered joint 66, where it joins a depressed portion 80 of coolant channel 78. After passing a downstream edge 82 of gusset 68, an upward step 84 joins depressed portion 80 with the remainder of coolant channel 78. Gusset 68 is preferably brazed to abutting surfaces of conductor bar 62 and end turn 64.

Figure 4:
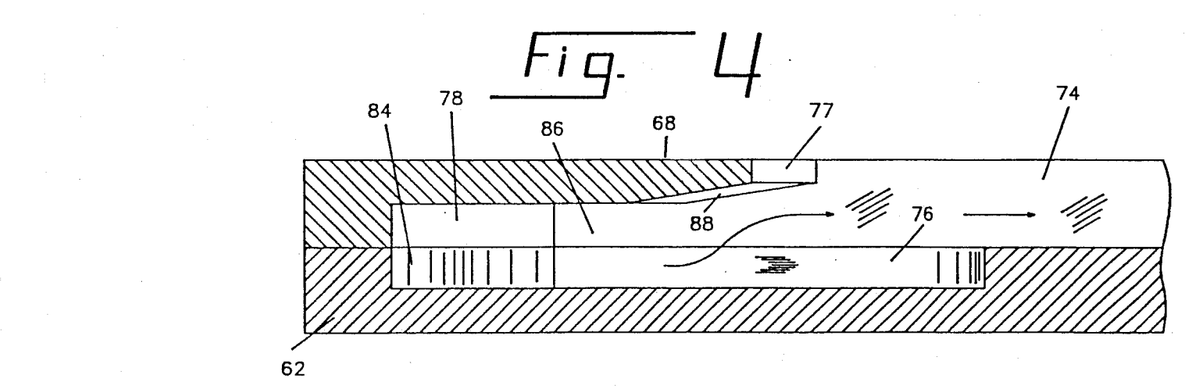
FIG. 4 is a cross section taken along IV—IV in FIG. 3.

Referring now to the cross section in FIG. 4, it will be seen that depressed portion 76 provides a lowered profile for coolant channel 74 permitting it to pass under gusset 68 without severing it into separate pieces. Gusset 68 includes a upward step 84 in its surface facing conductor bar 62, generally congruent with a portion of depressed portion 76 which it overlaps. As seen in the cross section in FIG. 5, groove 86 continues unbroken in congruence with a portion of depressed portion 80 which it overlaps.

Figure 5:
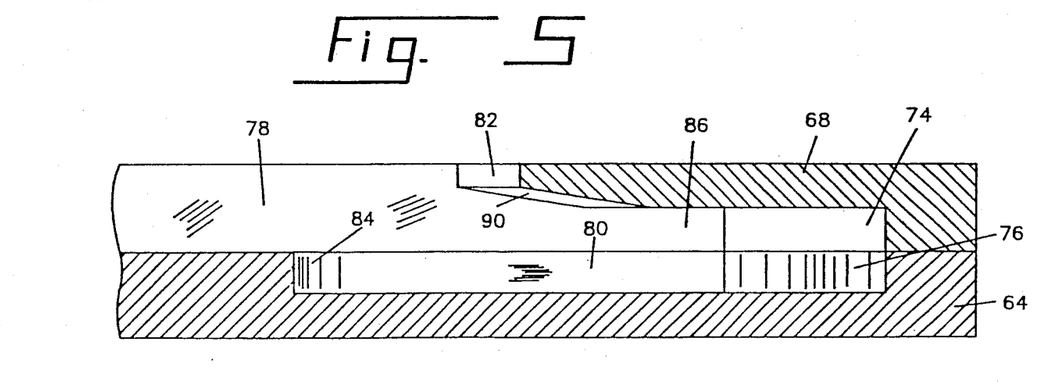
FIG. 5 is a cross section taken along V—V in FIG. 3.

A bevel 88 adjacent coolant channel 78 reduces flow resistance for gas passing through the flow channel made up of depressed portion 76 and groove 86. Similarly, a bevel 90 reduces the flow resistance for gas passing through the flow channel formed by groove 86 and depressed portion 80.

Figure 6:
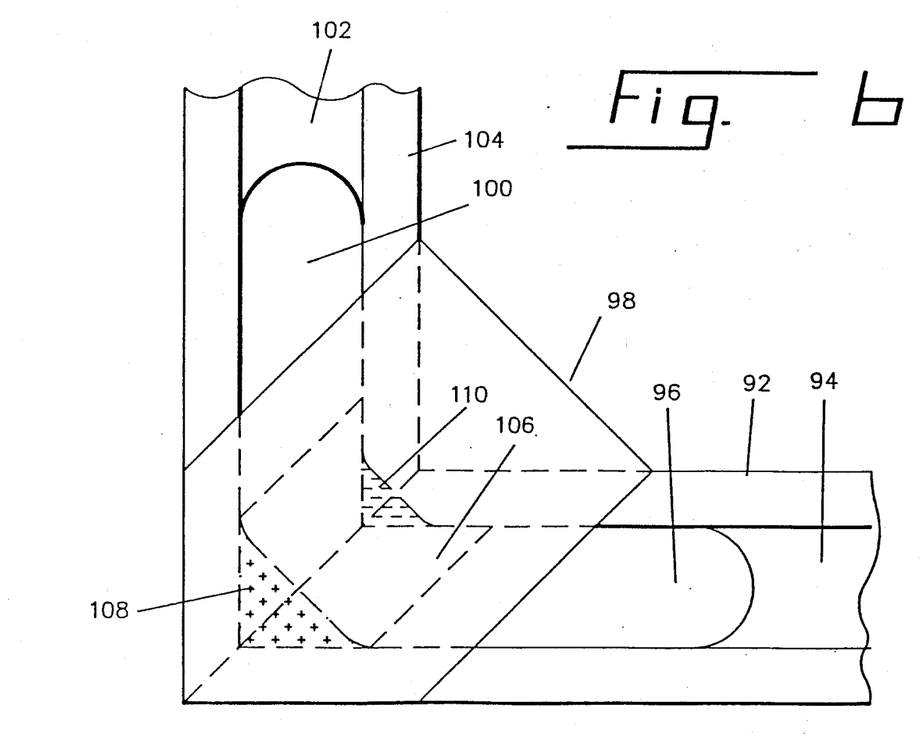
FIG. 6 is a top view of a miter joint and gusset according to a further embodiment of the invention.

Referring now to FIG. 6, a modified version of the apparatus is shown in which reduced flow resistance and greater brazing area is provided. Only those elements important for understanding the difference between this embodiment and the preceding embodiment are identified and described.

A conductor bar 92 includes a coolant channel 94 having a depressed portion 96 passing under a gusset 98. Depressed portion 96 joins a depressed portion 100 of a coolant channel 102 in an end turn 104. A diagonal portion 106 joins depressed portion 96 and 100. The presence of diagonal portion 106 performs two functions. First, by turning the gas flow over a larger radius, flow resistance is reduced. In addition, a greater facing area of gusset 98 with conductor bar 92 and end turn 104 increases the strength contributed by gusset 98. The increase in brazing area is equal to the difference between an added area 108, indicated by plusses, and a subtracted area 110, indicated by minuses.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What I claim is:

1. Apparatus for cooling a portion of a dynamoelectric machine, said dynamoelectric machine being of a type having at least one conductor bar and at least one end turn contiguous to said at least one conductor bar, comprising:

a joint at a junction of said at least one conductor bar and said at least one end turn;
   a first groove in a first surface of said conductor bar;
   first means for retaining a coolant in said first groove;
   a second groove in a second surface of said end turn;
   second means for retaining said coolant in said second groove;
   said first and second grooves communicating said coolant at said joint;
   a gusset;
   said gusset overlapping a first portion of said conductor bar adjacent to said joint;
   said gusset further overlapping a second portion of said end turn adjacent to said joint, whereby said joint is strengthened;
   said gusset including a surface facing said first and second grooves;
   said surface including a third groove; and
   said third groove being substantially congruent to facing portions of said first and second grooves, whereby a flow channel for said coolant is formed passing through said joint, whereby a single flow of coolant is effective for coolant both said end turn and said conductor bar.

2. Apparatus according to claim 1, wherein:
   said at least one conductor bar includes a first rabbet adjacent said joint;
   said at least one end turn includes at a second rabbet adjacent said joint;
   said gusset being fitted within said first and second rabbets with a second surface thereof substantially coplanar with surfaces of said at least one conductor bar and said at least one end turn.

3. Apparatus for cooling a portion of a dynamoelectric machine, said dynamoelectric machine being of a type having at least one conductor bar and at least one end turn contiguous to said at least one conductor bar, comprising:

a joint at a junction of said at least one conductor bar and said at least one end turn;
   a first groove in a first surface of said conductor bar;
   first means for retaining a coolant in said first groove;
   a second groove in a second surface of said end turn,
   second means for retaining said coolant in said second groove; said first and second grooves communicating said coolant at said joint;
   a gusset;
   said gusset overlapping a first portion of said conductor bar adjacent to said joint;
   said gusset further overlapping a second portion of said end turn adjacent to said joint, whereby said joint is strengthened;
   said gusset including a surface facing said first and second grooves;
   said surface including a third groove;
   said third groove being substantially congruent to facing portions of said first and second grooves, whereby a flow channel for said coolant is formed passing through said joint, whereby a single flow of coolant is effective for cooling both said end turn and said conductor bar;
   said first groove includes a first depressed portion;
   said first depressed portion extending from said joint along said at least one conductor bar beyond said gusset, whereby said flow channel in a portion thereof defined by said gusset and said conductor bar includes a height equal to a sum of depths of said first groove, said third groove and said first depressed portion;
   said second groove includes a second depressed portion, deeper than said second groove; and
   said second depressed portion extending from said joint along said at least one end turn beyond said gusset, whereby said flow channel in a portion thereof defined by said gusset and said end turn includes a height equal to a sum of depths of said second groove, said third groove and said second depressed portion.

4. Apparatus according to claim 3, wherein:

said gusset includes first and second bevelled portions at extremities thereof facing said first end second depressed portions, respectively; and said first and second bevelled portions being effective for reducing a flow resistance of coolant passing through said flow channel.

5. Apparatus for cooling a portion of a dynamoelectric machine, said dynamoelectric machine being of a type having at least one conductor bar and at least one end turn contiguous to said at least one conductor bar, comprising:

a joint at a junction of said at least one conductor bar and said at least one end turn;

a first groove in a first surface of said conductor bar;

first means for retaining a coolant in said first groove;

a second groove in a second surface of said end turn;

second means for retaining said coolant in said second groove; said first and second grooves communicating said coolant at said joint;

a gusset;

said gusset overlapping a first portion of said conductor bar adjacent to said joint;

said gusset further overlapping a second portion of said end turn adjacent to said joint, whereby said joint is strengthened;

said gusset including a surface facing said first and second grooves;

said surface including a third groove;

said third groove being substantially congruent to facing portions of said first and second grooves, whereby a flow channel for said coolant is formed passing through said joint, whereby a single flow of coolant is effective for cooling both said end turn and said conductor bar;

said gusset includes first and second bevelled portions at extremities thereof facing said first and second grooves, respectively; and said first and second bevelled portions being effective for reducing a flow resistance of coolant entering and exiting said flow channel.

6. Apparatus for cooling a portion of a dynamoelectric machine, said dynamoelectric machine being of a type having at least one conductor bar and at least one end turn contiguous to said at least one conductor bar, comprising:

a joint at a junction of said at least one conductor bar and said at least one end turn;

a first groove in a first surface of said conductor bar;

first means for retaining a coolant in said first groove;

a second groove in a second surface of said end turn;

second means for retaining said coolant in said second groove; said first and second grooves communicating said coolant at said joint;

a gusset;

said gusset overlapping a first portion of said conductor bar adjacent to said joint;

said gusset further overlapping a second portion of said end turn adjacent to said joint, whereby said joint is strengthened;

said gusset including a surface facing said first and second grooves;

said surface including a third groove;

said third groove being substantially congruent to facing portions of said first and second grooves, whereby a flow channel for said coolant is formed passing through said joint, whereby a single flow of coolant is effective for cooling both said end turn and said conductor bar;

axes of said at least one conductor bar and said at least one end turn meet at an first angle;

said first groove including a first angled portion adjacent said joint; said second groove including a second angled portion adjacent said joint;

said first and second angled portions meeting each other at said joint;

said first and second angled portions together defining a diagonal portion which is diagonal to said axes.

7. Apparatus for cooling a portion of a dynamoelectric machine, said dynamoelectric machine being of a type having at least one conductor bar and at least one end turn contiguous to said at least one conductor bar, comprising:

a joint at a junction of said at least one conductor bar and said at least one end turn;

a first groove in a first surface of said conductor bar;

first means for retaining a coolant in said first groove;

a second groove in a second surface of said end turn;

second means for retaining said coolant in said second groove;

said first and second grooves communicating said coolant at said joint;

a first rabbet in said conductor bar adjacent said joint;

a second rabbet in said end turn adjacent said joint;

a gusset fitted into said first and second rabbets, with its outer surface substantially coplanar with outer surfaces of said conductor bar and said end turn;

said gusset overlapping a first portion of said conductor bar adjacent to said joint;

said gusset further overlapping a second portion of said end turn adjacent to said joint, whereby said joint is strengthened;

said gusset including a surface facing said first and second grooves;

said surface including a third groove; and said first groove includes a first depressed portion;

said first depressed portion extending from said joint along said at least one conductor bar beyond said gusset;

said second groove includes a second depressed portion;

said second depressed portion extending from said joint along said at least one end turn beyond said gusset;

said third groove being substantially congruent to facing portions of said first and second depressed portions;

depths of said first and second depressed portions being such that a depth of a flow channel beneath said gusset is no less than a depth of said first and second grooves outside said first and second depressed portions.

8. Apparatus according to claim 7, wherein:

said gusset includes first and second bevelled portions at extremities thereof facing said first and second depressed portions, respectively; and said first and second bevelled portions being effective for reducing a flow resistance of coolant passing through said flow channel.

9. Apparatus according to claim 7 wherein:

axes of said at least one conductor bar and said at least one end turn meet at a first angle;

said first groove including a first angled portion adjacent said joint;

said second groove including a second angled portion adjacent said joint;

said first and second angled portions meeting each other at said joint;
said first and second angled portion together defining a diagonal portion which is diagonal to said axes, whereby said flow channel reduces the speed at which said coolant is required to turn in passing through said flow channel.

* * * * *